United States Patent
Wijnia et al.

(10) Patent No.: US 12,497,240 B2
(45) Date of Patent: Dec. 16, 2025

(54) METHOD, FEEDER UNIT AND DISPENSING SYSTEM FOR DISPENSING DISCRETE MEDICAMENTS

(71) Applicant: VMI HOLLAND B.V., Epe (NL)

(72) Inventors: Aalf Wijnia, Epe (NL); Hendrik Leendert 't Lam, Epe (NL); Patrick Van Voorn, Epe (NL); Rogier Scheide, Epe (NL)

(73) Assignee: VMI HOLLAND B.V., Epe (NL)

( * ) Notice: Subject to any disclaimer, the term of this patent is extended or adjusted under 35 U.S.C. 154(b) by 193 days.

(21) Appl. No.: 18/572,216

(22) PCT Filed: Jun. 22, 2022

(86) PCT No.: PCT/NL2022/050361
§ 371 (c)(1),
(2) Date: Dec. 20, 2023

(87) PCT Pub. No.: WO2022/271026
PCT Pub. Date: Dec. 29, 2022

(65) Prior Publication Data
US 2024/0246765 A1     Jul. 25, 2024

Related U.S. Application Data

(63) Continuation of application No. 17/353,964, filed on Jun. 22, 2021, now Pat. No. 11,498,761.

(51) Int. Cl.
*B65G 1/04*     (2006.01)
*A61J 7/00*     (2006.01)
(Continued)

(52) U.S. Cl.
CPC ............ *B65G 1/137* (2013.01); *A61J 7/0069* (2013.01); *A61J 7/0076* (2013.01);
(Continued)

(58) Field of Classification Search
CPC ......... G07F 11/16; G07F 17/00; B65G 1/137; B65G 2203/0208; A61J 7/0069; A61J 7/0076; A61J 2205/60; B65D 83/0409
(Continued)

(56) References Cited

U.S. PATENT DOCUMENTS

| 5,946,883 A | 9/1999 | Yuyama |
| 6,394,308 B1 | 5/2002 | Yuyama et al. |

(Continued)

FOREIGN PATENT DOCUMENTS

| EP | 2987147 B1 | 7/2017 | |
| WO | WO-2014171818 A1 * | 10/2014 | ........... G01F 23/292 |

*Primary Examiner* — Leslie A Nicholson, III
(74) *Attorney, Agent, or Firm* — Ipsilon USA—NLO

(57) ABSTRACT

The invention relates to a method for step dispensing discrete medicaments from a feeder unit, wherein the feeder unit comprises a container holding said medicaments, and a dispensing mechanism, wherein the dispensing mechanism comprises a singulating body with a plurality of singulation chambers; and a first release member arranged below the singulating body and provided with a release opening, wherein the first release member and the singulating body are movable with respect to each other, the method comprising the steps of: moving the singulating body and the first release member relative to each other; when the singulating body is in the aligned position, stopping relative movement between the singulating body and the first release member; maintaining the singulating body stationary for a predetermined waiting period to allow any medicaments accommodated in the aligned singulation chamber to fall through the release opening.

21 Claims, 9 Drawing Sheets

(51) Int. Cl.
*B65D 83/04* (2006.01)
*B65G 1/137* (2006.01)

(52) U.S. Cl.
CPC ....... *B65D 83/0409* (2013.01); *A61J 2205/60* (2013.01); *B65G 2203/0208* (2013.01)

(58) Field of Classification Search
USPC .......................................................... 221/12
See application file for complete search history.

(56) References Cited

U.S. PATENT DOCUMENTS

| | | | |
|---|---|---|---|
| 7,258,248 B2 | 8/2007 | Kim | |
| 7,277,776 B2 * | 10/2007 | Kim | G07F 11/62 |
| | | | 700/242 |
| 10,173,830 B2 * | 1/2019 | 'T Lam | G01F 23/292 |
| 11,273,103 B1 * | 3/2022 | Brakkee | B65G 1/045 |
| 11,498,761 B1 * | 11/2022 | Wijnia | G07F 11/16 |
| 2014/0366489 A1 * | 12/2014 | Scholten | B65B 37/02 |
| | | | 53/154 |

* cited by examiner

METHOD, FEEDER UNIT AND DISPENSING SYSTEM FOR DISPENSING DISCRETE MEDICAMENTS

BACKGROUND

The invention relates to a method, a feeder unit and a dispensing system for dispensing discrete medicaments. Furthermore, the invention relates to a test station for testing a feeder unit, and a method for determining a fill level of a feeder unit.

A method for dispensing a medicament from a feeder unit is discussed in WO 2014/171818, wherein the method comprises the steps of accommodating one of said medicaments or more of said medicaments in a single row, in one of a plurality of singulation chambers of an singulating body; moving said singulating body with respect to a first release member arranged below said singulating body and provided with an release opening, to align one of said plurality of singulation chambers with said release opening, wherein a separating member which extends out into or over said one of said plurality of singulation chambers substantially blocks said one of said plurality of singulation chambers above a lower most medicament in said one of said plurality of singulation chambers, wherein said lower most medicament falls through said release opening into one of a plurality of waiting chambers of a storage body which is arranged below said first release member, wherein a filling of said one of a plurality of waiting chambers is detected by the use of a detection arrangement for at least facilitating the detection whether or not one or more of said waiting chambers are filled with the medicament(s); moving said storage body with respect to a second release member arranged below said storage body and provided with an dispensing opening, to align one of said plurality of waiting chambers with said dispensing opening, wherein the medicament(s) in said one of said plurality of waiting chambers falls through said dispensing opening and is dispensed out of the feeder unit.

SUMMARY OF THE INVENTION

In the feeder unit according to the prior art, a medicament, such as a tablet or capsule, is received in a waiting chamber of the storage body from the singulating body. In order to reliably dispense the medicament from the feeder unit, the waiting chambers of the storage body have to be filled reliably. Therefore, the singulating body is rotated slowly until a drop of a medicament into one of the waiting chambers is detected. If the singulating body is rotated too quickly, the medicament tends to skip over the singulation chambers of the singulating body. Using a slow rotation speed is disadvantageous as the dispensing speed of the feeder unit is determined by the slowly rotating wheel and, therefore, is rather low.

Furthermore, in the prior art, feeder units usually are filled completely with a specific medicament, such as tablets or capsules. For some medicaments, the expiry date as indicated by the manufacturer is advanced when the medicaments are removed from their bulk or blister packaging. Simply filling the feeder units to an arbitrary fill level may result in expiry of the medicament before the medicament is dispensed.

It is an object of the present invention to ameliorate or to eliminate one or more disadvantages of the prior art, to provide an improved dispensing method or system or to at least provide an alternative method, feeder unit and dispensing system for dispensing discrete medicaments.

A first aspect provides a method for step dispensing discrete medicaments from a feeder unit, wherein the feeder unit comprises a container holding said medicaments, and a dispensing mechanism configured for receiving the medicaments from the container and selectively dispensing the medicaments, wherein the dispensing mechanism comprises a singulating body with a plurality of singulation chambers; and a first release member arranged below the singulating body and provided with a release opening, wherein the first release member and the singulating body are movable with respect to each other in order to subsequently align one of the plurality of singulation chambers with the release opening, the method comprising the steps of:

moving the singulating body and the first release member relative to each other into an aligned position in which one of the plurality of singulation chambers is aligned with the release opening;

when the singulating body is in the aligned position, stopping relative movement between the singulating body and the first release member; and maintaining the singulating body stationary with respect to the first release member for a predetermined waiting period to allow any medicaments accommodated in the aligned singulation chamber to fall through the release opening.

During use, the singulating body is moved with respect to the first release member into an aligned position, whereafter the singulating body is maintained stationary with respect to the first release member. The singulating body, thus, makes a stepped or stop-and-go movement with respect to the first release member. When the arranged body is maintained stationary to the first release member in a position where a singulating chamber aligns with the release opening, a medicament is enabled to pass through the release opening, and further medicaments are allowed to move into one of the plurality of singulation chambers.

The precise alignment and stepped movement of the respective singulating body and first release member ensures that the singulating body is moved into a position in which a medicament may freely pass through the release opening. Thus, there is no need (as there was in prior art systems) to require sensing of the release or perform a slow moving of the singulating body into a position in which a medicament may fall through the release opening.

The method of using the stepped or stop-and-go movement has as an advantage that the relative movement between the singulating body and the first release member is not relied upon to cause the medicaments to fall through the release opening, thereby allowing for faster movements. The movement is simply controlled to precisely align one of the singulation chambers of the singulating body with the release opening in the first release member, prior to allowing the medicaments to fall from the singulating body through the release opening. The relative moment between the singulating body and the first release member is therefore not restricted by limitations of the drop behavior and may therefore be relatively fast, particularly when compared to prior art systems which had problems of "skipping" with movements which were too fast. As a result, the overall dispensing rate of medicaments from the feeder unit may be considerably faster than the dispensing rate of medicament from a feeder unit according to the prior art, while maintaining reliability by ensuring stops for specific predetermined waiting periods that the specific medicament will likely take to fall from the singulation chamber, and during which further medicaments may move into one or more of the singulation chambers. These predetermined times can be set or found in a number of ways, for example, through a lookup table associated with particular types of medicaments, through a test station, through data regarding past movements of medicaments through feeders, etc. and may be within the range between 40 and 120 milliseconds. Thus, the feeder results in faster dispensing while reliably ensuring that a medicament does dispense, and therefore a decrease in total dispensing time resulting in an overall improvement in performance.

In an embodiment, the method comprises the step of resuming the relative movement between the singulating body and the first release member after the predetermined waiting period. In an embodiment thereof, the step of resuming the relative movement between the singulating body and the first release member comprises the step of moving the singulating body and the first release member relative to each other into a further aligned position in which another one of the plurality of singulation chambers is aligned with the release opening, when the predetermined waiting period has expired. An advantage of this embodiment is that it is prevented that the singulating body is maintained stationary to the first release member too long, while no medicament is present in the singulation chamber aligned with the release opening. Therefore, a predetermined dispensing speed is advantageously maintained, and an overall dispensing rate or speed from the feeder remains high.

In an embodiment, the method further comprises detecting whether or not a medicament falls through the release opening. In an embodiment thereof, the step of detecting whether or not a medicament falls through the release opening further comprises the steps of ending the predetermined waiting period and starting a further predetermined waiting period, when it is detected that a medicament has through fallen the release opening. Optionally, the predetermined waiting period has a first length, and the further predetermined waiting period has a second length that is shorter than the first length. When a medicament has fallen through the release opening, for example, into a waiting chamber therebelow, there is no longer a need to await expiration of the predetermined time period. Thereof, the predetermined time period is ended and a further predetermined time period is started, which further predetermined time period is shorter than the predetermined time period. The further predetermined time period allows the medicament that fell into the respective waiting chamber to come to a standstill, as the medicament may have the tendency to bounce upwards after falling into the respective waiting chamber. This is advantageous as it prevents the medicament from being damaged due to relative movement between the singulating body and the first release member, while the medicament bounced partially back into the singulation chamber from which the medicament fell into the waiting chamber. At the same time, the dispensing speed of the dispensing system may be kept as high as possible.

In an embodiment, the method further comprises moving the singulating body and the first release member back and forth relative to each other and back into the aligned position, when a medicament is expected to fall through the release opening it is detected that a medicament has not fallen through the release opening during the predetermined waiting period. For example, movement of the singulating body is accomplished by means of a stepper motor. According to this embodiment, the stepper motor may be operated to make a few steps back and forth again, such that a medicament that is stuck within the singulating body advantageously may be shaken loose and subsequently may fall through the release opening. These are generally very small back and forth movements, less than a movement that would cause an alignment with an adjacent singulating chamber.

In an embodiment, the feeder unit is provided with a position encoder that is calibrated so that encoders steps are indicative of the aligned positions. Alternatively, another method or type of alignment device could be used, such as a protrusion and notch system, a stepped gear, etc. which would allow for ensuring movement precisely into an aligned position. In an embodiment thereof, the step of moving the singulating body and the first release member relative to each other comprises the step of determining the position of the singulating body and the first release member relative to each other in order to move the singulating body into an aligned position. In an even further embodiment thereof, the step of stopping relative movement between the singulating body and the first release member comprises stopping relative movement between the singulating body and the first release member when it is determined that the singulating body is in an aligned position. By means of the position encoder and/or other alignment device or system, the position of one of the singulation chambers of the singulating body with respect to the release opening of the first release member may be determined relatively easily and quickly. Therefore, there is no need to incorporate a complex control for controlling movement of the singulating body, and the method and overall system may be kept relatively simple, low-cost and easier to maintain.

In an embodiment, the feeder unit comprises a storage body arranged below the first release member and comprising one or more waiting chambers, the one or more waiting chambers being configured for receiving a medicament from one of the singulation chambers when said one singulation chamber, the release opening and the respective one or more waiting chamber are in alignment.

In an embodiment, the feeder unit comprises a second release member arranged below the storage body and provided with a dispensing opening, wherein the second release member and the storage body are moveable with respect to each other in order to subsequently align one of the one or more waiting chambers with the dispensing opening. In an embodiment thereof, the method comprises the step of dispensing one or more medicaments from the dispensing opening. The step of dispensing one or more medicaments received by the storage body from the dispensing opening at the bottom side of the feeder unit comprises the step of moving the storage body and the second release member relative to each other in order to align one of the one or more waiting chambers with the dispensing opening, such that the medicaments in the one of the one or more of waiting chambers falls through the dispensing opening and are dispensed out of the container.

In an embodiment, the step of moving the singulating body and the first release member relative to each other comprises the step of rotating the singulating body with respect to the first release member into an aligned position in which one of the plurality of singulation chambers is aligned with the release opening. In particular, the singulating body is rotated at a rotation speed that causes the medicaments to be dispensed to plane above the singulating body. For example, the singulation body may be rotated with a rotation speed of at least 1 rotations per second, in another embodiment at least 1.5 rotations per second, and in yet another embodiment approximately 1.9 rotations per second.

In a further embodiment the discharged medicaments are passed through the through opening of the dispensing device vertically or substantially vertically from said one feeder unit. The discharged medicaments can thus be allowed to settle from the rotational movement and subsequently fall from the feeder unit solely under the influence of gravity.

In a further embodiment the singulating body is maintained stationary for the predetermined waiting period to allow any medicaments accommodated in the aligned singulation chamber to fall vertically or substantially vertically through the release opening to a collection tray of the number of collection trays. Again, the discharged medicaments can thus be allowed to settle from the rotational movement and subsequently fall from the feeder unit solely under the influence of gravity.

A second aspect provides a feeder unit for dispensing discrete medicaments, comprising:
  a container holding said medicaments,
  a dispensing mechanism for receiving the medicaments from the container and selectively dispensing the medicaments from the feeder unit, the dispensing mechanism comprising:
    a singulating body with a plurality of singulation chambers;
    a first release member arranged below the singulating body and provided with a release opening, wherein the first release member and the singulating body are movable with respect to each other; and
    an encoder to determine relative positioning between the singulation chambers and the release opening in the first release member.

Such a feeder unit can efficiently and reliably release medicaments from the container. By using an encoder to be able to easily and quickly determine relative positioning, the feeder can quickly rotate such that a singulation chamber is aligned with the release opening, and remain in such a position for a predetermined amount of time for the medicament to travel through the opening. The singulating body can then quickly move such that the subsequent singulation chamber is aligned with the opening using the encoder to ensure proper alignment quickly, and stop there for the predetermined time as well. Thus, the dispensing mechanism is able to easily, efficiently and reliably release medicaments from the container. Other embodiments could use a different system to ensure alignment in place of the encoder, such as a notch and protrusion system, etc.

In an embodiment, the feeder unit further comprises a storage body arranged below the first release member and comprising one or more waiting chambers, the one or more waiting chambers being configured for receiving a medicament from one of the singulation chambers when said singulation chamber, the release opening and the respective one or more waiting chambers are in alignment.

In an embodiment, the encoder is located at or near the release opening.

In an embodiment, the one or more waiting chambers comprise a plurality of waiting chambers, and the feeder unit comprises a second release member arranged below the storage body and provided with a dispensing opening, wherein the second release member and the storage body are moveable with respect to each other in order to subsequently align one of the one or more waiting chambers with the dispensing opening.

In an embodiment, the feeder unit further comprises a detection arrangement for determining whether a medicament has fallen through the release opening.

A third aspect provides a dispensing system accommodating one or more feeder units, which system is arranged for selectively dispensing an amount of discrete medicaments from the one or more feeder units, the system comprising:
  a dispensing device provided with an array of dispensing positions arranged adjacently in a plane, wherein the dispensing device at each of said array of dispensing positions is provided with a holder for one of the feeder units and with a through opening for passing discharged medicaments there through,
  a collection device arranged below the dispensing device, wherein the collection device and the dispensing device are movable with respect to each other, wherein the collection device is provided with a number of collection trays, wherein each of the trays comprises a receiving opening at a side facing the dispensing device for receiving discharged medicaments and each comprises an output, and
  a controller for controlling the working of the system and the one or more feeder units arranged on the dispensing device,
  wherein the controller, for each of the one or more feeder units, is configured for
    moving a singulating body and a first release member arranged below the singulating body and provided with an release opening relative to each other into an aligned position in which one of the plurality of singulation chambers is aligned with the release opening;
    when the singulating body is in the aligned position, stopping relative movement between the singulating body and the first release member; and
    maintaining the singulating body stationary with respect to the first release member for a predetermined waiting period to allow any medicaments accommodated in the aligned singulation chambers to fall through the release opening.

The dispensing system according to the invention has at least the same technical advantages as described in relation to the method according to the first aspect.

In an embodiment, the controller further is configured to resume the relative movement between the singulating body and the first release member after the predetermined waiting period.

In an embodiment, the controller further is configured to:
  maintain the singulating body stationary with respect to the first release member for a predetermined waiting period to allow any medicaments in the aligned singulation chamber to fall through the release opening into one of one or more waiting chambers of a storage body which is arranged below the first release member.

In an embodiment, the controller is further configured to:
  dispense one or more medicaments received by the one or more waiting chambers from a dispensing opening.

In an embodiment, the dispensing system further comprises a packing unit for collecting the received medicaments from the output of a tray and packing the medicaments.

In a further embodiment the discharged medicaments are passed through the through opening of the dispensing device vertically or substantially vertically from said one feeder unit.

In a further embodiment the singulating body is maintained stationary for the predetermined waiting period to allow any medicaments accommodated in the aligned singulation chamber to fall vertically or substantially vertically through the release opening to a collection tray of the number of collection trays.

A fourth aspect provides a test station configured for testing a feeder unit for dispensing discrete medicaments, the test station comprising:
- a docking position configured for receiving a feeder unit to be tested, wherein the docking position comprises:
- a receiving portion configured for at least partially receiving the feeder unit to be tested,
- a drive configured for operatively connecting to the feeder unit and for driving the feeder unit to dispense a medicament therefrom,
- one or more sensors configured for sensing the behaviour of the medicament within the feeder unit and/or for sensing the behaviour of a medicament of the plurality of medicaments dispensed from the feeder unit, and
- a controller operatively connected to the sensor and to the drive, and configured for being operatively connected to the feeder unit to be tested,
- wherein the controller is configured for, upon driving the feeder unit, receiving data from the one or more sensors pertaining to the behaviour of the medicament within the feeder unit and/or the behaviour of the medicaments dispensed from the feeder unit, and
- wherein the controller further is configured for determining parameters to control the tested feeder unit on basis of the data received from the one or more sensors.

According to the prior art, a feeder unit is designed specifically for dispensing a particular medicament such as a tablet. The inventors have come to the insight that medicaments have among others different shapes, weights and shear resistances at the outer surface thereof. As a result, a medicament within a feeder unit, for example, may fall from a singulation chamber of the singulating body through the release opening into a waiting chamber of the storage body therebelow relatively fast, where another medicament needs more time for the same fall. The test station according to the invention advantageously provides the possibility to test a feeder unit in combination with the medicament for which it is designed, and to determine parameters for optimally controlling the feeder unit when inserted into a dispensing system. As a result, separation of a tablet from the plurality of tablets within the feeder unit and release thereof from the feeder unit may advantageously become reliable and individually optimized, for example, on dispensing speed and safety.

In an embodiment, the test station comprises a chute located below the feeder unit to be tested and configured for receiving a medicament dispensed from the feeder unit.

In an embodiment, the one or more sensors comprises a first sensor for sensing the behaviour of the medicament within the feeder unit, and/or a second sensor for sensing the behaviour of a medicament of the plurality of medicaments dispensed from the feeder unit. In an embodiment thereof, the first sensor is configured for sensing whether a medicament is separated from the plurality of medicaments within the feeder unit, and/or the second sensor is configured for sensing whether a medicament of the plurality of medicaments is dispensed from the feeder unit. This embodiment has as an advantage that the parameters may be optimized for separation behaviour of medicaments, as well as for the falling behaviour of medicaments.

Additionally, the second sensor is configured for sensing a medicament moving through the chute, but also provides the possibility to determine whether a complete or half medicament is passing by, for example, on basis of the time needed for the medicament to pass the second sensor. Therefore, it is advantageously possible to correct for dispensing broken medicament when the feeder unit is placed in the dispensing system, or at least to signal that a broken medicament is dispensed from the feeder unit.

In an embodiment, the test station comprises an identifying unit configured for identifying a feeder unit to be tested that is received at the docking position. In an embodiment thereof, the controller is operatively connected to the identifying unit in order to receive data pertaining to an identified feeder unit, wherein the controller further is configured for saving and/or transmitting the determined parameters in association with the identified feeder unit. According to this embodiment, the determined parameters may be saved in a database in association with the tested and identified feeder unit, such that the dispensing system may retrieve the save parameters from the database when the respective feeder unit is inserted into and identified by the dispensing system.

In an embodiment, the identifying unit is configured for reading a RFID tag of a feeder unit to be tested.

A fifth aspect provides a method for testing a feeder unit by means of a test station according to the fourth aspect, the method comprising the steps of:
- filling the feeder unit with medicaments to a predetermined fill level;
- docking the feeder unit into the docking position of the test station;
- driving the feeder unit in order to dispense at least one medicament from the feeder unit;
- while driving the feeder unit, detecting the behaviour of the medicaments within the feeder unit and/or the behaviour of a medicament dispensed from the feeder unit;
- on basis of data associated with the detected behaviour of the medicaments within the feeder unit and/or the detected behaviour of a medicament dispensed from the feeder unit, determining parameters to control the tested feeder unit.

The method according to the invention at least provides the same technical advantages as described in relation to the test station according to the fourth aspect.

In an embodiment, the method comprises the step of identifying the docked feeder unit.

In an embodiment, the method comprises the step of, after the step of determining the parameters, determining whether the test process is completed. In an embodiment thereof, the method comprises the step of repeating the following steps, when it is determined that the test process is not completed:
- driving the feeder unit in order to dispense at least one medicaments from the feeder unit;
- while driving the feeder unit, detecting the behaviour of the medicaments within the feeder unit and/or the behaviour of a medicament dispensed from the feeder unit;
- on basis of data associated with the detected behaviour of the medicaments within the feeder unit and/or the detected behaviour of a medicament dispensed the feeder unit, determining parameters to control the tested feeder unit. It may occur that after dispensing a predetermined amount of medicaments from the feeder unit, the feeder unit is still not functioning perfectly. Therefore, it might be necessary to further test the feeder unit in order to finetune the parameters to be determined for the respective feeder unit. This may advantageously result in an optimally functioning feeder unit.

In an embodiment, the method comprises the following step, when it is determined that the test process is completed:
saving the determined parameters, together with the identification of the tested feeder unit, and, optionally, into a database.

In an embodiment, the method comprises the step of repeating the following steps one or more times:
filling the feeder unit with medicaments to a predetermined fill level;
driving the feeder unit in order to dispense at least one medicaments from the feeder unit;
while driving the feeder unit, detecting the behaviour of the medicaments within the feeder unit and/or the behaviour of a medicament dispensed from the feeder unit;
on basis of data associated with the detected behaviour of the medicaments within the feeder unit and/or the detected behaviour of a medicament dispensed from the feeder unit, determining parameters to control the tested feeder unit
wherein the fill level of the feeder unit differs for each repetition of the steps. In an embodiment thereof, each repetition of the steps is performed for a predetermined fill level, wherein the fill levels for the repetitions have at least a difference of 5%. In an even further embodiment thereof, the step of determining parameters to control the tested feeder unit comprises the step of providing a recommendation about an optimum fill level of the tested feeder unit. The inventors have surprisingly found that the fill level of a feeder unit may influence the dispensing of medicaments from that feeder unit. Therefore, testing of the feeder unit is repeated for different fill levels of the feeder unit, for example for fill levels of 208, 40%, 60%, 80% and 100%. As a result, it may be determined with which fill level the feeder unit is dispensing optimally, and/or which dispensing speed to choose in relation to a particular fill level of the feeder unit.

In an embodiment, the method comprises the step of checking whether any error occurs during testing of the feeder unit. In an embodiment thereof, the step of checking whether any error occurs during testing of the feeder unit comprises:
detecting that an amount of time during which the one or more sensors detect a medicament exceeds a predetermined threshold; and/or
detecting that an amount of time needed for a singulating body of the feeder unit to move into a next aligned position exceeds a predetermined threshold. An advantage of this embodiment is that by checking whether errors occur during testing of the feeder unit, insight is gained into which parameters to control the feeder unit result in more or less errors. This allows the method to determine the parameters for controlling the tested feeder unit, while keeping the number of errors as low as possible.

In an embodiment, the step of determining parameters to control the tested feeder unit comprises the step of determining a driving speed for the feeder unit. In the context of the present application, the driving speed of the feeder unit has to be understood as the rotation speed of the singulating body and/or of the storage body of the feeder unit. The driving speed of the singulating body, for example, effectuates separation of a single medicaments of the plurality of medicaments within the feeder unit, where the driving speeds of the storage body effectuates the time needed for moving a next waiting chamber above the dispensing opening and, thus, for dispensing a medicament from the feeder unit. By determining the driving speed, the feeder unit may function optimally when inserted into a dispensing system.

In an embodiment, step of determining the parameters to control the tested feeder unit comprises the step of determining a waiting period for the feeder unit. During use of the feeder unit in a dispensing system, the singulating body is moved into an aligned position in which one of the singulation chambers is aligned with the release opening, whereafter the singulating body is maintained stationary with respect to the first release member for a predetermined waiting period. This waiting period enables a medicament to fall from the singulation chamber above the release opening into a waiting chamber below the release opening, and depends of the medicament to be dispensed. The method for testing allows the optimal waiting period to be determined for the medicament to be dispensed.

In an embodiment, the step of determining parameters to control the tested feeder unit comprises the step of providing a recommendation about an optimum dispensing speed of the tested feeder unit. This embodiment, advantageously, may provide a recommendation for a dispensing speed at which medicaments are dispensed from the tested feeder unit as fast as possible, while, for example, keeping the number of errors as low as possible.

A sixth aspect provides a method for determining a fill level of a feeder unit, the method comprising the steps of:
receiving an indication indicating that a feeder unit needs to be filled with a medicament;
determining the throughput of the respective medicament for a predetermined time period;
receiving a term in which the medicament to be filled into the feeder unit expires; and
determining a fill level for the feeder unit on basis of the determined throughput and the received term, wherein it is taken into account that the feeder unit is emptied before the expiration of the medicament to be filled into the feeder unit.

The method provides a fill level for the feeder unit that is designed for a particular medicament. The fill level is determined on basis of the determined throughput, which indicates the amount of medicaments dispensed within a particular time period, such as a day, and on basis of the term in which the particular medicament expires. For example, the term is given in the number of days in which the medicament expires It, therefore, may be expected that the feeder unit filled to the determined fill level is empty before expiration of the medicament within the feeder unit. An advantage of the method, thus, is that the amount of waste medicament is reduced or in the ideal case waste medicament is prevented.

In an embodiment, the step of receiving an indication comprises the step of receiving an indication that the feeder unit is empty or almost empty.

In an embodiment, the step of determining the throughput comprises the step of determining the throughput of the respective medicament since the last time the feeder unit was filled. Determining the throughput of the medicament since the last time the feeder unit was filled, results in a determined throughput that gives a realistic impression of the amount of medicaments dispensed since the last fill of the feeder unit. The risk to expiration of the expiry date before all medicaments within the feeder unit are dispensed, therefore, is kept to a minimum.

Alternatively, the step of determining the throughput comprises the step of determining the throughput of the respective medicament since the first time the medicament has been dispensed.

In an embodiment, the step of receiving a term in which the medicament expires comprises the step of taking into account a shortened term in which the medicament to be filled in the feeder unit expires. Sometimes, the manufacturer of a medicament shortens the term in which the medicament expires, when the medicament is removed from the bulk or blister packaging thereof. This embodiment, advantageously, takes the advanced expiry date into account, such that the amount of waste medicament is reduced or in the ideal case waste medicament is prevented, even when the medicament has an advanced expiry date.

In the context of the present application, a medicament has to be understood to relate to, but not be limited to, a tablet, a capsule, or the like.

The various aspects and features described and shown in the specification can be applied, individually, wherever possible. These individual aspects, in particular the aspects and features described in the attached dependent claims, can be made subject of divisional patent applications.

DETAILED DESCRIPTION OF THE INVENTION

Figure 1:
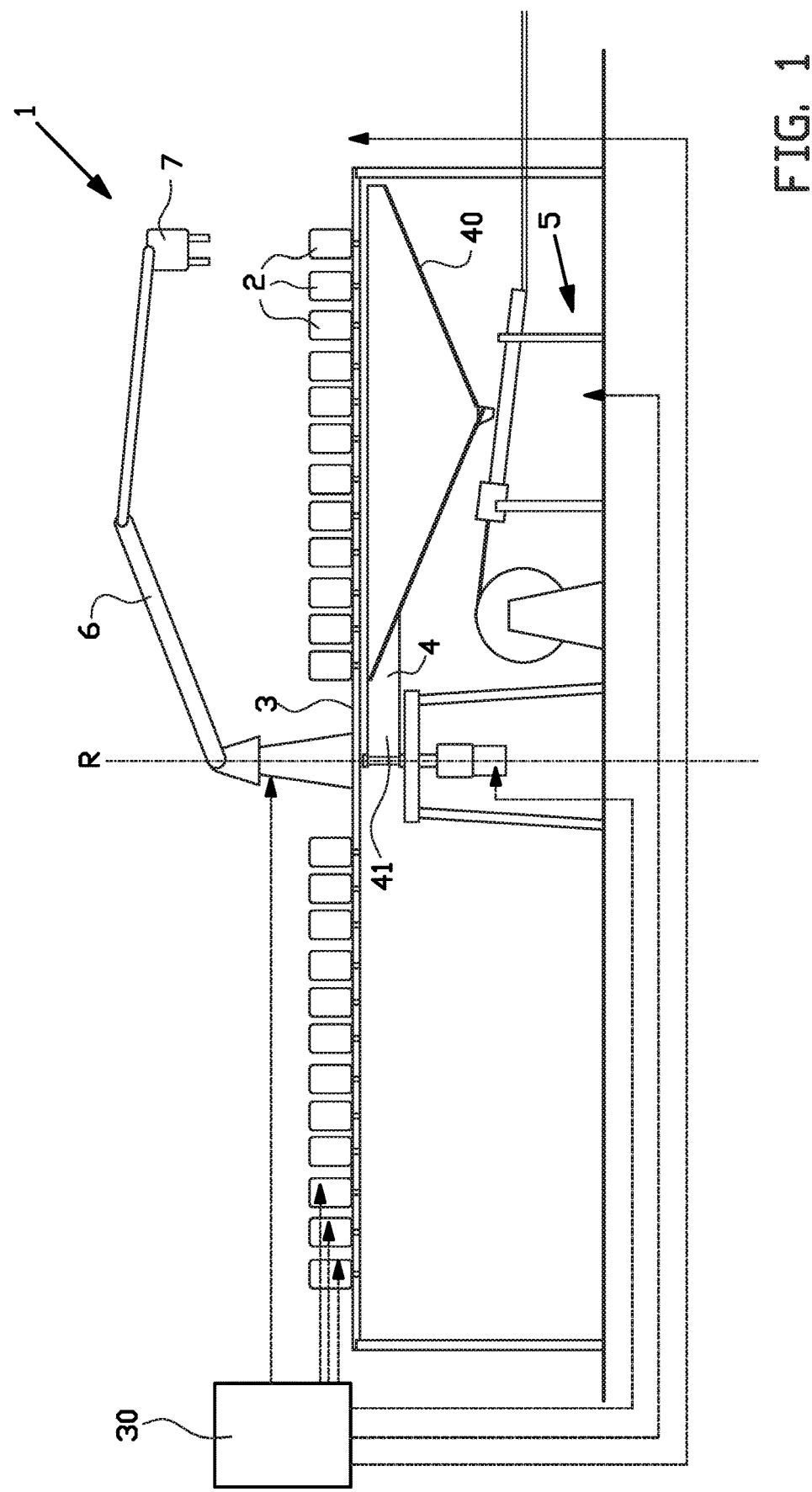
FIG. 1 shows a schematic cross section of a dispensing system having a dispensing device provided with an array of dispensing positions for accommodating a number of feeder units for selectively dispensing an amount of medicaments from one or more feeder units and for packing the dispensed amount.
Figure 2:
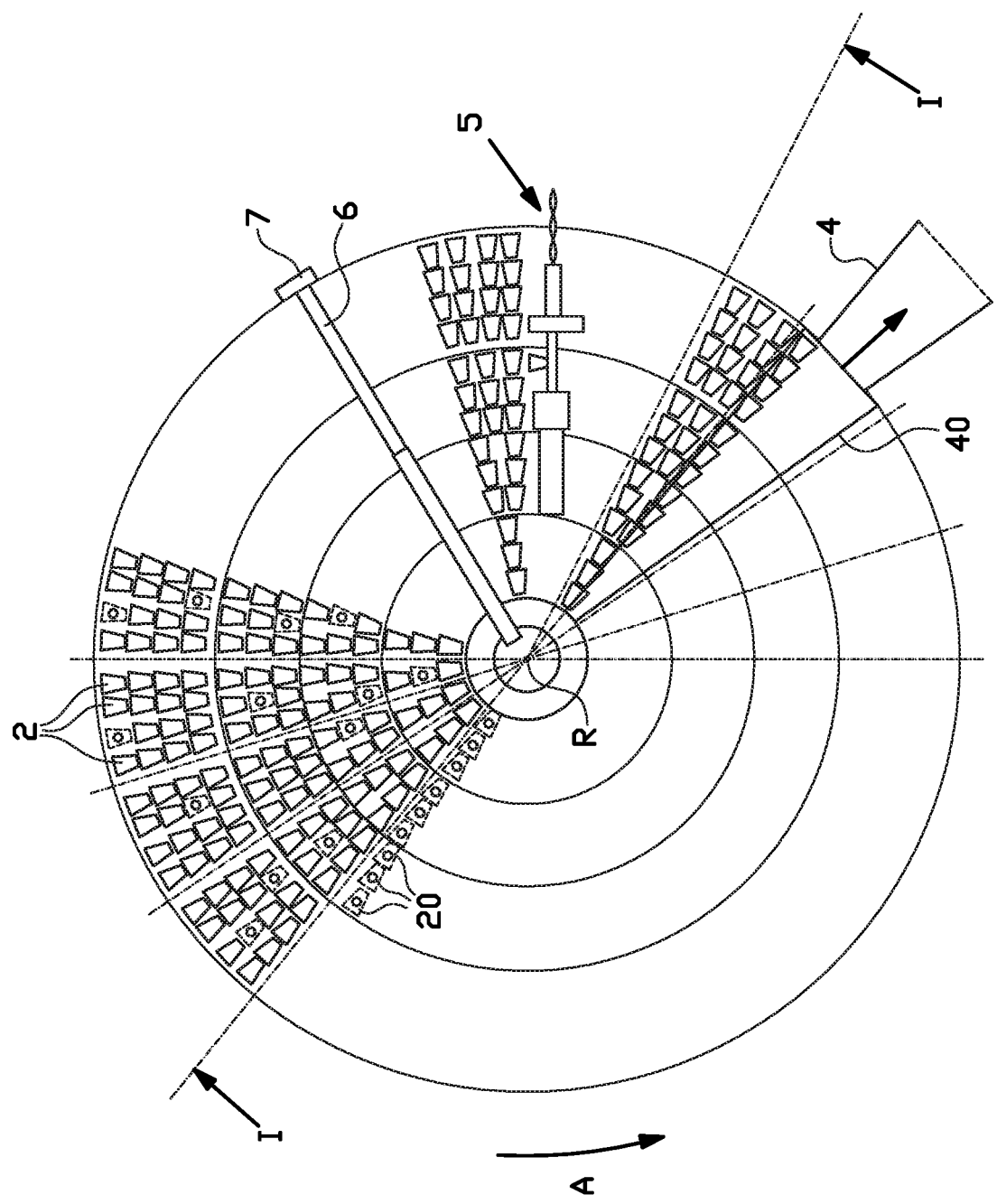
FIG. 2 shows a schematic top view of the dispensing system of the embodiment of FIG. 1.

A schematic cross-section of a dispensing system 1 that accommodates a number of feeder units 2 for selectively dispensing an amount of medicaments, pharmaceuticals or solid items, articles or substances for medical use, e.g. pills, tablets, capsules or the like, from one or more feeder units 2 and for packing the dispensed amount of medicaments, is shown in FIGS. 1 and 2. The medicaments are 'discrete' in the sense that they can be dispensed one-by-one, individually, separately or in dose units.

The dispensing system 1 comprises a dispensing device 3 configured for dispensing the medicaments. A collection device 4 is arranged below the dispensing device 3, which collection device 4 is configured for collecting the dispensed medicaments from the dispensing device 3. A packing unit 5 is arranged below the collection device 4, which packing unit 5 is configured for packing the collected medicaments. Optionally, the dispensing system 1 is provided with a (not shown) housing for shielding the dispensing device 3, the collection device 4 and the packing unit 5 from unauthorized access.

The dispensing device 3 is provided with an array of dispensing positions 20 with a (not shown) holder for holding a plurality of feeder units 2, also known as canisters or tablet cases. The dispensing positions 20 are distributed circumferentially about a rotation axis R. In particular, as best shown in FIG. 2, the dispensing positions 20 are distributed according to a radial grid having a number of rows with feeder units 20 arranged radially about a rotation axis R.

As further shown in FIG. 1, the dispensing system 1 further comprises a robotic manipulator 6, such as a robot arm, configured for handling the feeder units 2 with respect to the dispensing positions. The robotic manipulator 6 is arranged on the dispensing device 3 at or near the rotation axis R thereof. The robotic manipulator 6 is configured for handling the feeder units 2 in an automatic manner, wherein handling comprises, but is not limited to positioning, removing and repositioning the feeder units 2 within the dispensing system 1. The robotic manipulator 6 is provided with a gripper 7 at the distal end thereof, which gripper 7 is configured for gripping one of the feeder units 2 in order to place the one of the feeder units 2 into the dispensing device 3, or to remove the one of the feeder units 2 from the dispensing device 3.

As shown in FIG. 1, the collection device 4 has a number of collection trays 40, also called collection hoppers. Each collection tray 40 extends radially below one or more feeder units 2 and is open at the side facing towards the dispensing device 2 in order to receive medicaments selectively dispensed from one or more feeder units 2. The collection trays 40 taper towards the packing unit 5, and are closed at the bottom by a valve such that collected medicaments may be released from the tray 40 to the packing unit 5 selectively.

The collection trays 40 are arranged in a collection frame 41 and are distributed circumferentially around the rotation axis R. The collection frame 41 is rotatable in a collection direction A about the rotation axis R in order to rotate the collection trays 40 with respect to the plurality of dispensing positions 20. For example, the rotation may be a stepped rotation such that each step of a tray aligns the collection tray 40 with a subsequent series of feeder units 2 arranged within the dispensing device 3.

The non-shown valve of a respective one of the plurality of trays 40 is opened when the respective one of the plurality of trays 40 is located above the packing unit 5 in order to in release collected medicaments from the respective one of the plurality of trays 40 into the packing unit 5. The packing unit 5 comprises a stock member for holding the packaging material, in this example a foil, a printer for printing information about the medicaments on the foil, a filling member for positioning the foil to receive the medicaments, a seal member for forming a pouch around the received medicaments, a perforation member for providing the foil with perforations between subsequently formed pouches and an output member for outputting the packaged medicaments from the dispensing system 1.

The dispensing system 1 further comprises a controller 30 that is operatively connected to the feeder units 2, the dispensing device 3, the collection device 4, the packing unit 5, the robotic manipulator 6, and other electronic equipment, such as drives, sensors and the like, for controlling operation of the dispensing system 1. In particular, the controller 30 is provided with a processor and a non-transitory computer-readable medium having computer instructions saved thereon that, when executed by the processor, cause the dispensing system 1 to perform the methods described in more detail below.

Figure 3:
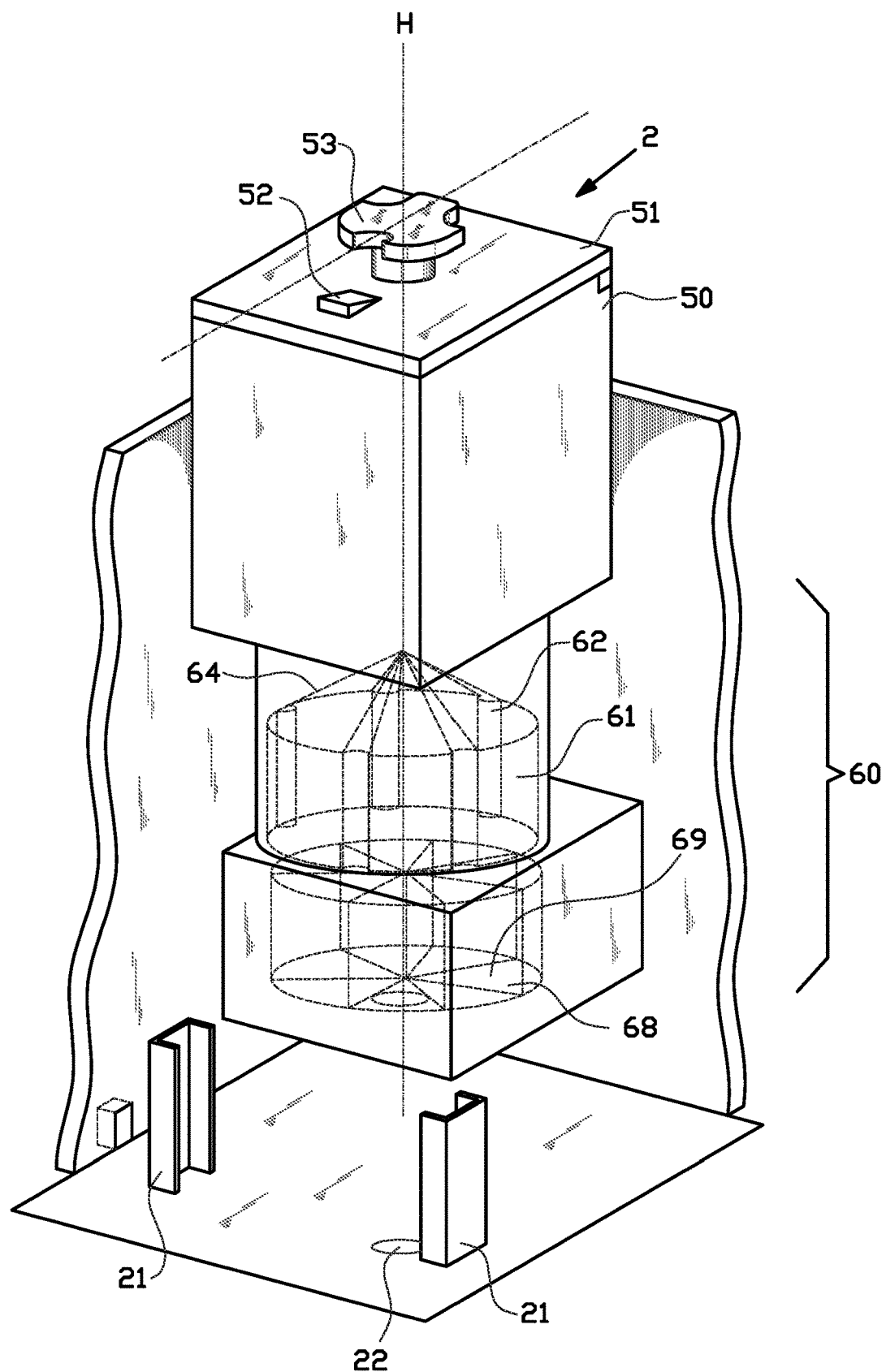
FIG. 3 shows a schematic view of a feeder unit.

A schematic view of an example of a feeder unit 2 is shown in FIG. 3. The feeder unit 2 comprises a container chamber 50 configured for holding a plurality of medicaments, and a container lid 51 that is hingeably connected to the container chamber 50 for opening the top of the container chamber 50 in order to gain access to a filling opening of the container chamber 50, such that the container chamber 50 may be refilled or medicaments within the container chamber 50 may be replaced with other medicaments. The container lid 51 has a locking latch 52 to enable to the container lid 51 to be locked in the closed position. Additionally, the container lid 51 is provided with a container grip 53 enabling an operator or the robotic manipulator 6 to grip the feeder unit 2 for handling it.

Figure 4:
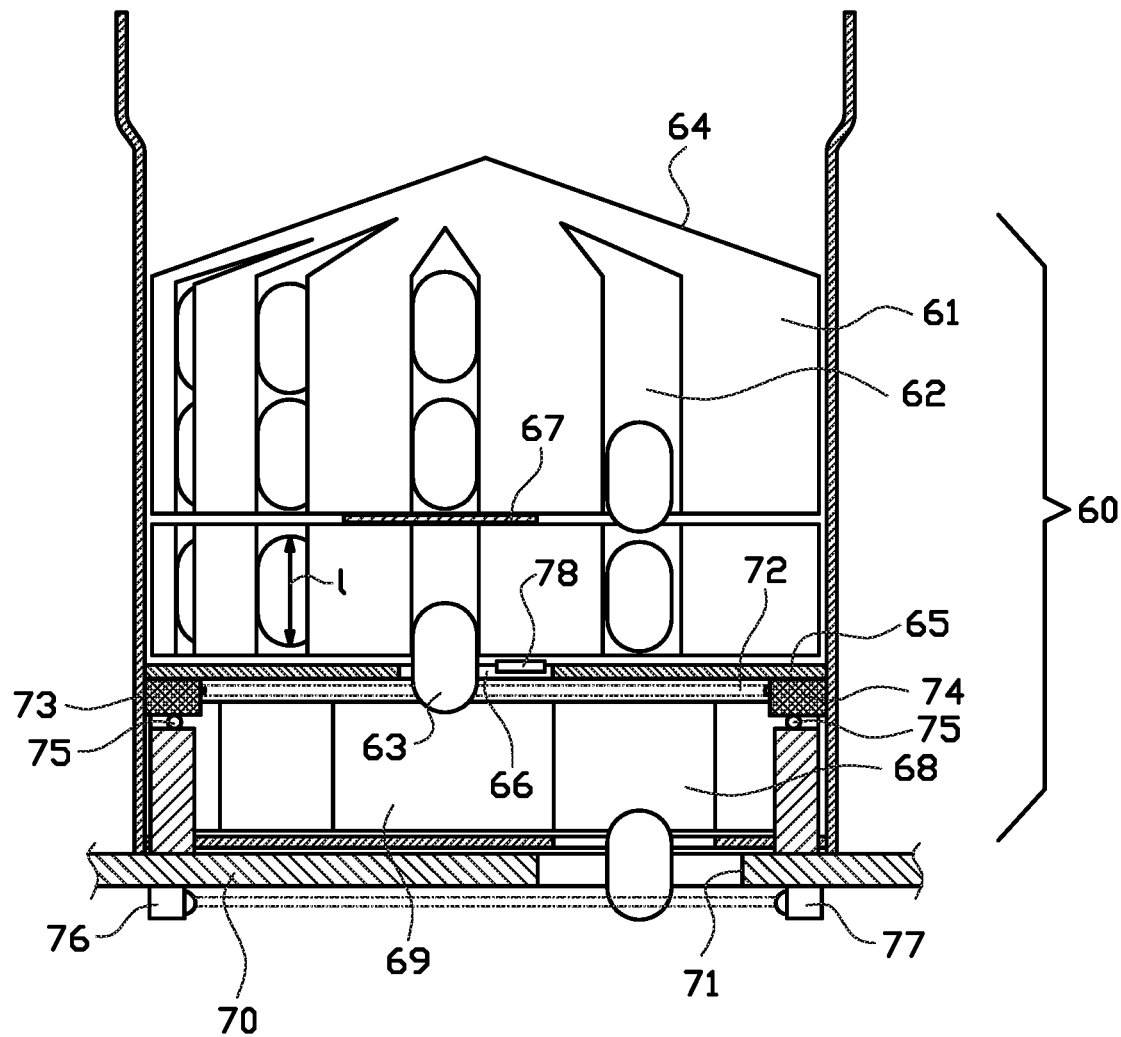
FIG. 4 shows a schematic cross section of the dispensing mechanism of the feeder unit of FIG. 3.

The feeder unit 2 comprises a dispensing mechanism 60 arranged below the container chamber 50. As shown in FIGS. 3 and 4, the dispensing mechanism 60 comprises a singulating body 61 with a plurality of singulation chambers 62, each of which is arranged for accommodating two or more of the medicaments 63 in a single row. The singulating body 61 comprises a conical top surface 64 for guiding the medicament 63 in the container chamber 61 towards the singulation chambers 62 which are arranged at the circumference of the singulating body 61. The singulating body 61 comprises a central axis which substantially coincides with the central axis h of the feeder unit 2.

A first release member 65 is arranged below the singulating body 61, which first release member 65 comprises a release opening 66. The first release member 65 is fixed inside and, therefore, stationary in the feeder unit 2, and the singulating body 61 is rotatable around its central axis in order to subsequently align one of the plurality of singulation chambers 62 with the release opening 66.

A separating member 67 is arranged above the first release member 65, which separating member 67 comprises a plate or a brush which extends out into the singulation chamber 62 that currently is aligned with the release opening 66. The distance between the separating member 67 and the first release member 65 is substantially equal to the length 1 of a single medicament 63 when arranged in the singulation chambers 62. The separating member 67 is arranged to allow only the lowermost medicament 63 directly above the first release member 65 to drop through the release opening 66, such that only one medicament 63 will fall through the release opening 66. In this example, the medicaments 63 fall through the release opening 66 vertically or substantially vertically towards, to or into one of the collection trays 40 underneath. Upon rotating the singulating body 61, the respective singulation chamber 62 is freed from the separating member 67, and the medicaments 63 are allowed to move downwards in the respective singulation chamber 62.

A storage body 68 is arranged below the first release member 65, which comprises a plurality of waiting chambers 69. Each waiting chamber 69 is arranged for receiving and accommodating the medicaments 63 from one singulation chamber 62. The storage body 68 comprises a central axis which substantially coincides with the central axis h of the feeder unit 2 and is rotatable around its central axis in order to subsequently align one of the plurality of waiting chambers 69 with the release opening 66.

A second release member 70 is arranged below the storage body 68, which is provided with an dispensing opening 71 for dispensing a medicament out of the feeder unit 2. The second release member 70 is fixed in the feeder unit 2, and the storage body 68 is rotatable with respect to the second release member 70 in order to subsequently align one of the plurality of waiting chambers 69 with the dispensing opening 71 to dispense the medicament 63 from the feeder unit 2. The dispensing opening 71 is arranged out of alignment with the release opening 66, such that a medicament 63 that falls into a waiting chamber 69 is detained inside the waiting chamber 69 and thus is not immediately dispensed out of the container 2.

As shown in FIGS. 4, the feeder unit 2 comprises a detection arrangement for at least facilitating a detection of whether a medicament 63 has fallen through the release opening 66 into the waiting chamber 69 below. This detection arrangement comprises a passage 72 for a light beam that crosses the release opening 66 and is arranged directly below the first release member 65 and the storage body 68. The detection arrangement further comprises a light source 73 for emitting a light beam through the passage 72 and a light detector 74 to detect the light beam and thereby the passing of a medicament 63 through the passage 72 which temporarily blocks the light beam. The light source 73 and light detector 74 are provided with connectors 75 for connecting with positioning columns 21 arranged on each dispensing position 20 for supplying power to the light source 73 and connecting the light detector 74 to the controller 30.

As shown in FIG. 4, the feeder unit 2 further comprises a further detection arrangement with a second light source 76 for emitting a second light beam which crosses the dispensing opening 71 and a second light detector 77 to detect the second light beam and thereby the passing of a medicament 63 through the dispensing opening 71 and into a drop tube 22 at the dispensing position 20.

Additionally, the feeder unit 2 is provided with an alignment encoder 75, also called position encoder, configured for determining whether one of the plurality of singulation chambers 62 is aligned, preferably fully, with the release opening 66, and operatively connected to the controller 30. The alignment encoder 75 is calibrated so that encoders steps are indicative for the aligned positions. In the context of the present invention, the term 'encoder' is to be interpreted as a device that converts a motion into an electrical or electronic signal. The alignment encoder 75 may be a rotary encoder or any other type of encoder, for example a series of holes strategically placed in the feeder unit 2 to allow light to selectively pass to a photocell when the singulation chambers 62 are in position. Alternatively, alignment could be determined through physical position sensing, such as protrusions entering a notch to determine an alignment.

In addition, the singulating body 61 and/or the storage body 68 are provided with a driving motor (not shown), such as a stepper motor, for driving the rotation of the singulating body 61 and the storage body 68 around their axis. For example, the rotating speed of the central singulating body 61 is approximately 1.9 rotations per second. The dispensing device 3 may supply power to the driving motor and/or connect the driving motor to the controller 30 via the position columns 21. Alternatively, the feeder unit 2 is not provided with a driving motor and an external driving motor for coupling to the singulating body 61 and the storage body 68 is arranged at each dispensing position 20.

Figure 5:
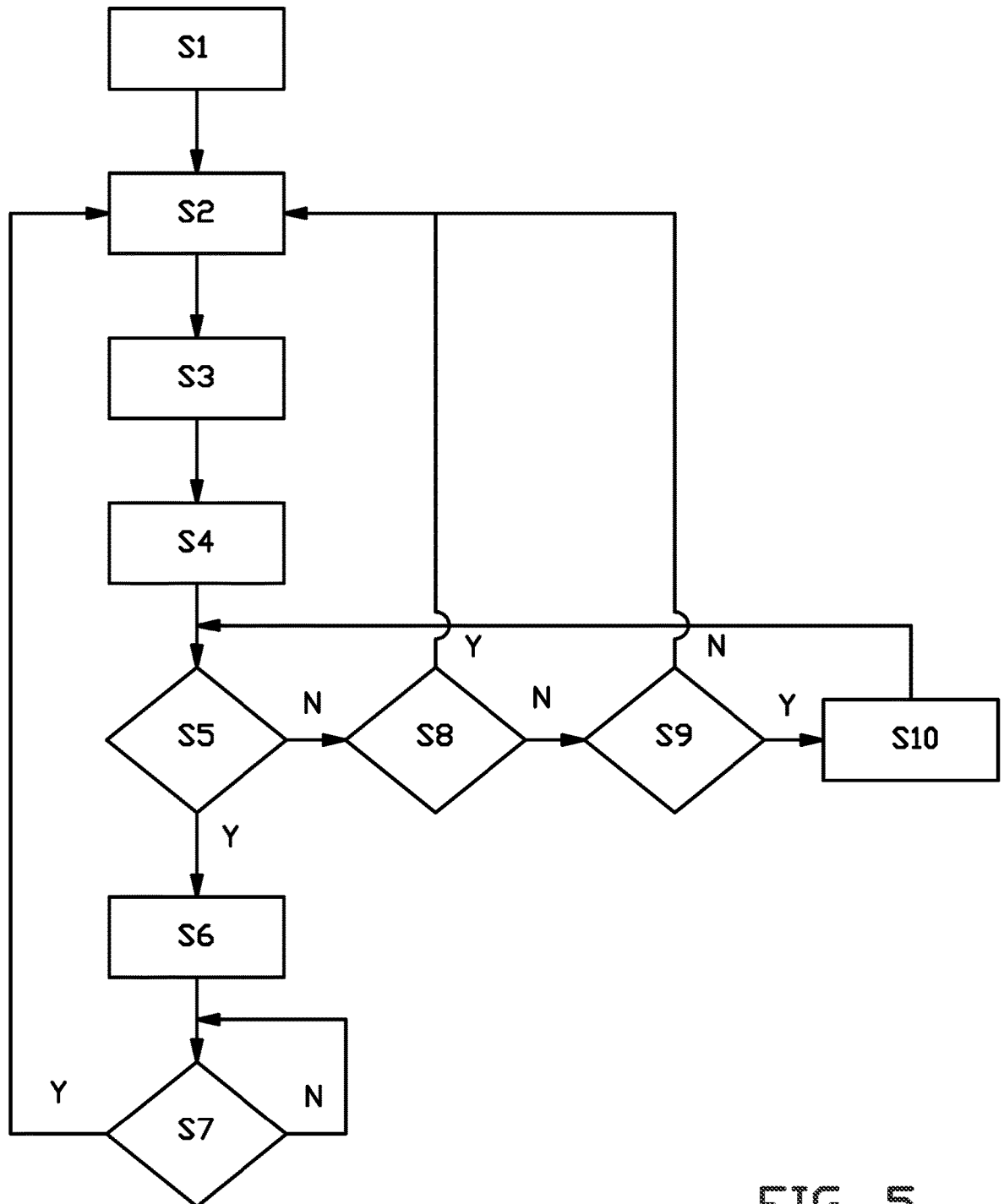
FIG. 5 shows a diagram of the steps of a method for dispensing a medicament from a feeder unit.

A method of dispensing a medicament from one of the feeder units 2 is described below with reference to a single feeder unit 2. The method comprises the following steps, which are also schematically shown in FIG. 5.

Step S1 relates to the step of accommodating one or more medicaments 63 into one or more of the plurality of singulation chambers 62 of the singulating body 61. Accommodating medicaments 63 into the singulation chambers 62 may be understood as allowing the medicaments 63 to move into the singulation chambers 62 while the singulating body 61 is moving or is standing still.

Step S2 relates to the step of moving the singulating body 61 with respect to the first release member 65 into an aligned position in which one of the plurality of singulation chambers 62 is aligned with the release opening 66. Whether the one of the plurality of singulation chambers 62 is aligned with the release opening 66 may be determined or measured by means of the alignment encoder 78 at the feeder unit 2, or other means of determining alignment such as a notch and protrusion arrangement. When it is determined that the one of the plurality of singulation chambers 62 is aligned with the release opening, movement of the singulating body 61 with respect to the first release member 65 is stopped, as is schematically indicated by step S3 in FIG. 5.

After stopping movement of the singulating body 61 with respect to the first release member 65, the singulating body 61 is maintained stationary S4 with respect to the first release member 65 for a predetermined waiting period. For example, the waiting period may be in the range between 40 and 120 milliseconds, in dependence of the size, shape and structure of the medicament to be dispensed. During this predetermined waiting period, the lowermost medicament 63 within the singulation chamber 62 above the release opening 66 is allowed to fall through the release opening 66. This can be into a waiting chamber 69 of the storage body 68 or into some other configuration, such as a hopper or chute in other embodiments. Simultaneously, further medicaments may move into singulation chambers 62. While the singulating body 61 is maintained stationary with respect to the first release member 65, the detection arrangement detects whether a medicament passes through the passage 72, which is indicated as step S5, though some embodiments may not have such sensing.

If a medicament is detected to have passed through release opening 66, the predetermined time period is ended and a further predetermined time period, which is shorter than the predetermined time period, is started, step S6, in order to allow the fallen medicament 63 to come to a standstill within the respective waiting chamber 69. After starting the further predetermined time period in step S6, a check is performed for checking whether the further predetermined time period has expired, step S7. If it is determined that the further predetermined time period has expired, it is assumed that the medicament 63 within the waiting chamber 69 has come to a standstill and the singulating body 61 may be moved into a subsequent aligned position in which the following one of the plurality of singulation chambers 62 is aligned with the release opening 66.

When it is determined that no medicament has passed through the release opening 66 and passage 72, it is determined whether the predetermined waiting period has expired, step S8. In the affirmative, the singulating body 61 may be moved into a subsequent aligned position in which the following one of the plurality of singulation chambers 62 is aligned with the release opening 66. In the non-affirmative, it is determined whether a medicament 63 was expected to fall through the release opening 66, step S9. If a medicament 63 was expected to fall through the release opening 66, said medicament 63 may be stuck in the singulating body 61. To loosen said medicament 63, the singulating body 61 is moved back and forth, preferably repeatedly, for example over a distance corresponding to half of a width of the medicament 63, and is then moved back into the aligned position with respect to the first release member 65, step S10, in order to cause a medicament 63 to fall into the waiting chamber 69 beneath the release opening 66. If a medicament was not expected to fall through the release opening 66, the singulating body 61 may be moved into a subsequent aligned position in which the following one of the plurality of singulation chambers 62 is aligned with the release opening 66, step S2.

The feeder unit 2 is able to operate to release medicaments more efficiently and reliably than past systems by rotating according to alignment, and simply waiting a predetermined time period for the medicament to fall. As explained above, past systems relied on slow rotations and/or actual detection of medicaments to ensure a medicament fell through the release opening, and that the singulating body could continue rotation and further release. The slower rotations or the actual sensing resulted in slower overall dispensing of the medicaments. By using step rotations—rotating the singulating body to a specifically aligned position (where a chamber 62 is in alignment with the release opening), and simply waiting a predetermined (short) waiting period before rotating to the next aligned position, feeder unit 2 is able to dispense more medicaments through the release opening in a reliable manner.

The controller 30 of the dispensing system 1 is configured for performing the method described above.

Figure 6:
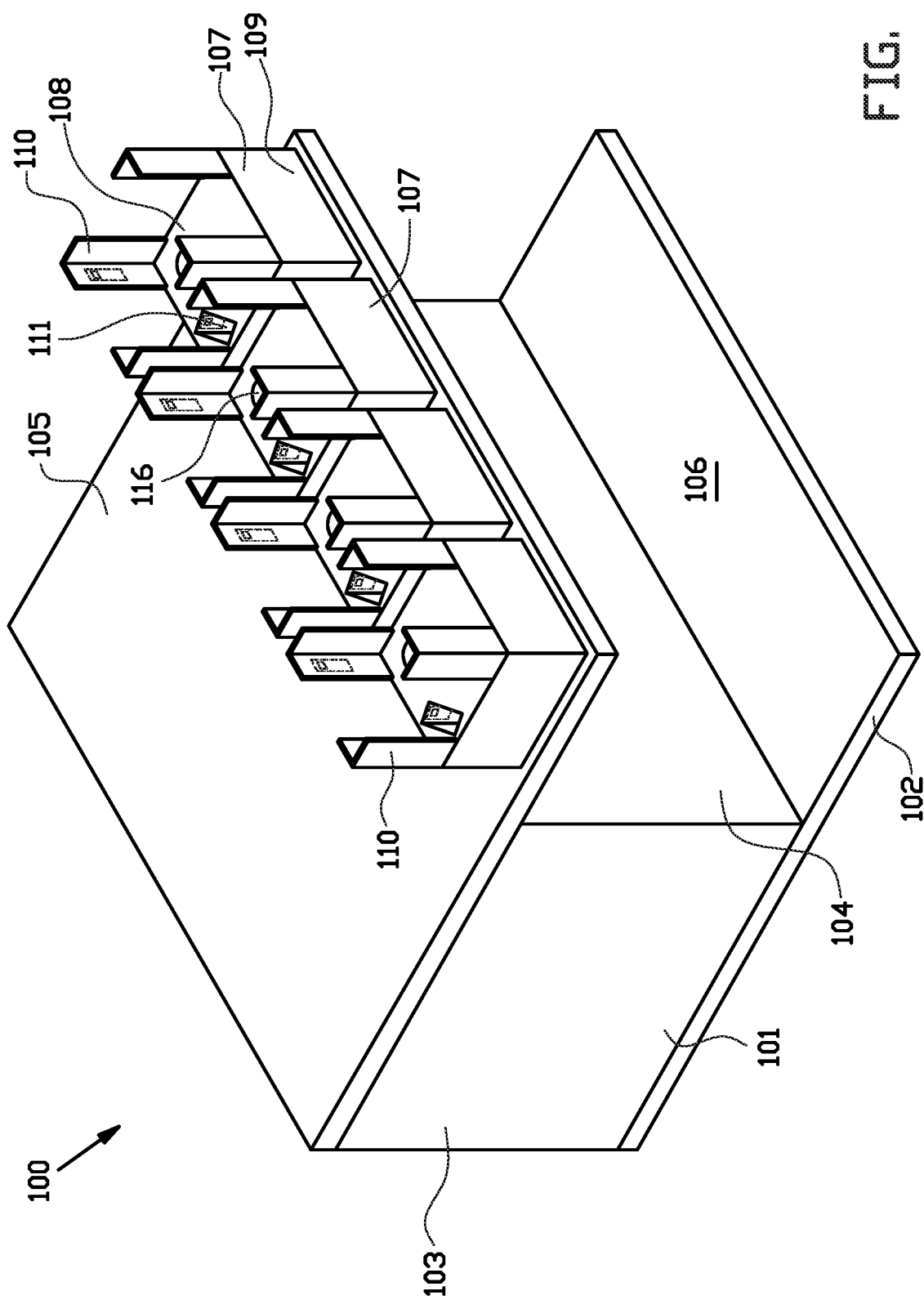
FIG. 6 shows a schematic view of a test station for testing a feeder unit with docking positions according to an embodiment.

A schematic view of a test station 100 for testing a feeder unit, according to an embodiment is shown in FIG. 6. Such a test station can be used to determine associated parameters with the feeder unit, for example, optimum fill levels, the predetermined time periods discussed above for specific medicaments, etc. The feeder unit to be tested may correspond to the feeder unit described above. The test station 100 comprises a station housing 101 with a bottom plate 102, two sidewalls 103, a front wall 104 and a back wall, all placed on top of the bottom plate 102, and a top plate 105 placed on top of the sidewalls 103, front wall 104 and the back wall. As shown in FIG. 6, the front wall 104 is situated at a recessed position with respect to the front side edge of both the bottom plate 102 and the top plate 105, such that a recipient space 106 is defined between the bottom plate 102 and the top plate 105, which is configured for receiving recipients.

A number of docking positions 107 are arranged next to each other on top of the top plate 105 and above the recipient space 106, wherein each of the docking positions 107 is configured for receiving a feeder unit to be tested. Each of the docking positions 107 is provided with a receiving portion 108 for receiving at least a part of a feeder unit. The receiving portion 108 has a receiving block 109 onto which the feeder unit to be tested may be placed. The receiving block 109 is provided with a number of positioning columns 110 configured for positioning the feeder unit to be tested correctly with respect to the receiving portion 108.

The receiving block 109 further comprises a chute 111 extending through the receiving block 109 from the top to the bottom, which chute 111 is aligned with a non-shown through hole provided within the top plate 105 and extends therethrough. When the feeder unit to be tested is docked within one of the docking positions 107, the dispensing opening 71 is positioned above the chute 111. As a result, a medicament dispensed from the feeder unit falls into the chute 111 and subsequently into a recipient placed within the recipient space 106 and below the chute 111 and the corresponding through hole. In this example, the medicaments fall vertically or substantially vertically from the feeder unit through the corresponding through hole.

Figure 7:
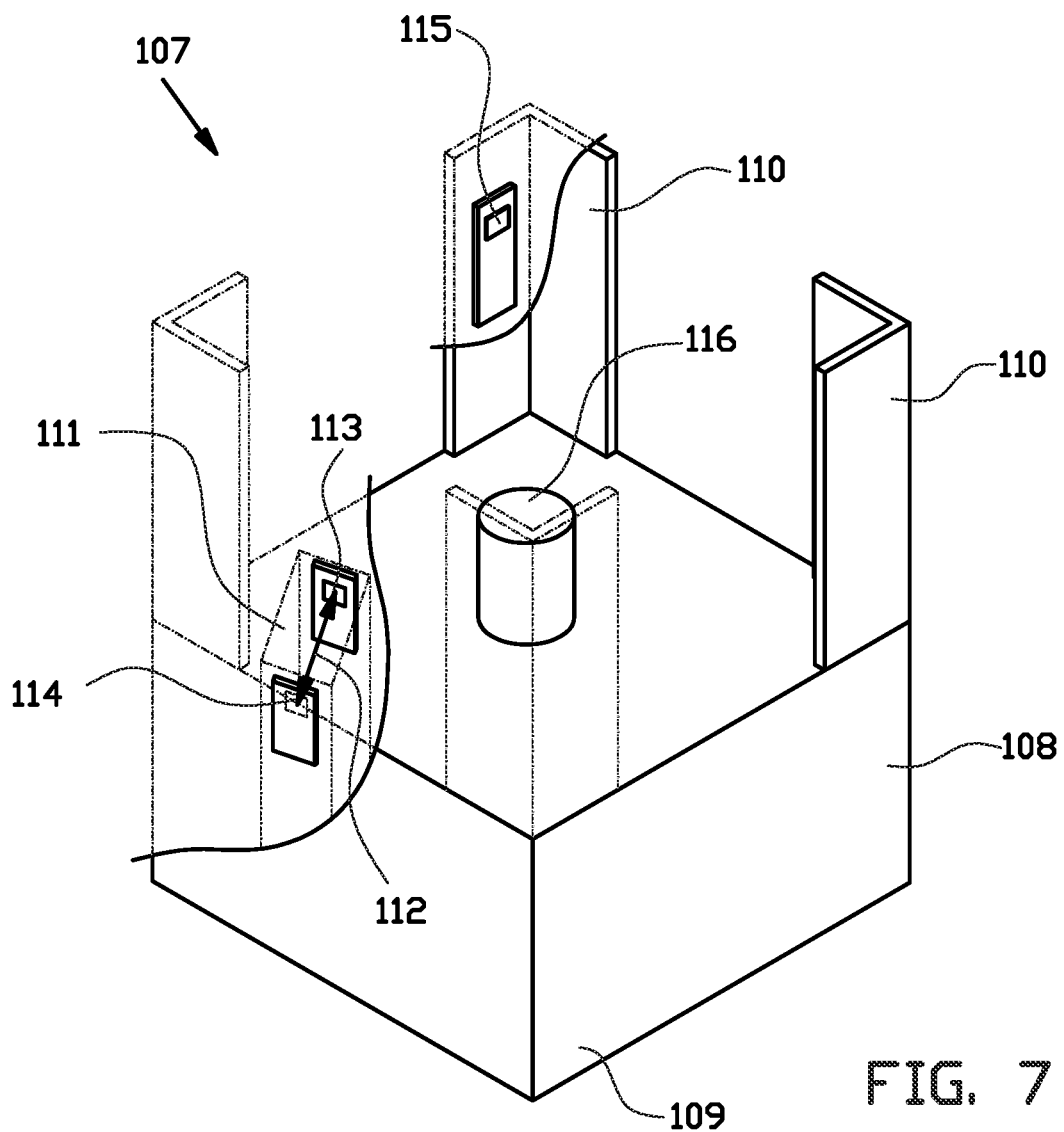
FIG. 7 shows a detailed view of a docking position of the test station of FIG. 6

As shown in FIG. 7, a drop detection arrangement is arranged within the chute 111 for at least facilitating a detection whether a medicament has dropped into the chute 111. The drop detection arrangement has a passage 112 for a light beam that crosses the chute and is arranged near the top side of the receiving block 109. The detection arrangement further comprises a light source 113 for emitting a light beam through the passage 112 and a light detector 114 to detect the light beam and thereby the dropping of a medicament through the chute 111 which temporarily blocks the light beam.

Furthermore, the test station 100, in this example, uses the detection arrangement of the feeder unit for at least facilitating a detection of whether a medicament has fallen through the release opening into the waiting chamber below as a separation detection arrangement. In particular, the separation detection arrangement is enabled to detect whether a medicament is separated from the remaining medicaments within the feeder unit and has moved into one of the waiting chambers of the storage body of the feeder unit.

Alternatively, the test station 100 may be provided with an own separation detection arrangement for at least facilitating a detection whether a medicament has fallen through the release opening into the waiting chamber below.

A driving motor, such as a stepper motor, is arranged within the receiving block 109. The driving motor is provided with a driving coupling 116 extending upwards from the receiving block 109 and configured for being coupled to the feeder unit in order to drive, in particular to rotate, the singulating body and the storage body of the feeder unit for dispensing a medicament therefrom.

Additionally, each of the docking positions 107 is provided with a RFID reader 115 for reading a RFID chip present within the feeder unit, such that test results may be coupled to the tested feeder unit.

Although not shown, the station housing 101 accommodates a power supply for powering the test station 100 and all its electric components, and a controller for controlling operation of the test station 100. The power supply and the controller are operatively connected to the drop detection arrangement, the separation detection arrangement, the driving motor, the RFID reader, and other electronic equipment, such as drives, sensor and the like. In particular, the controller is provided with a processor and a non-transitory computer-readable medium having computer instructions saved thereon that, when executed by the processor, cause the test station 100 to perform the method described in more detail below.

Figure 8:
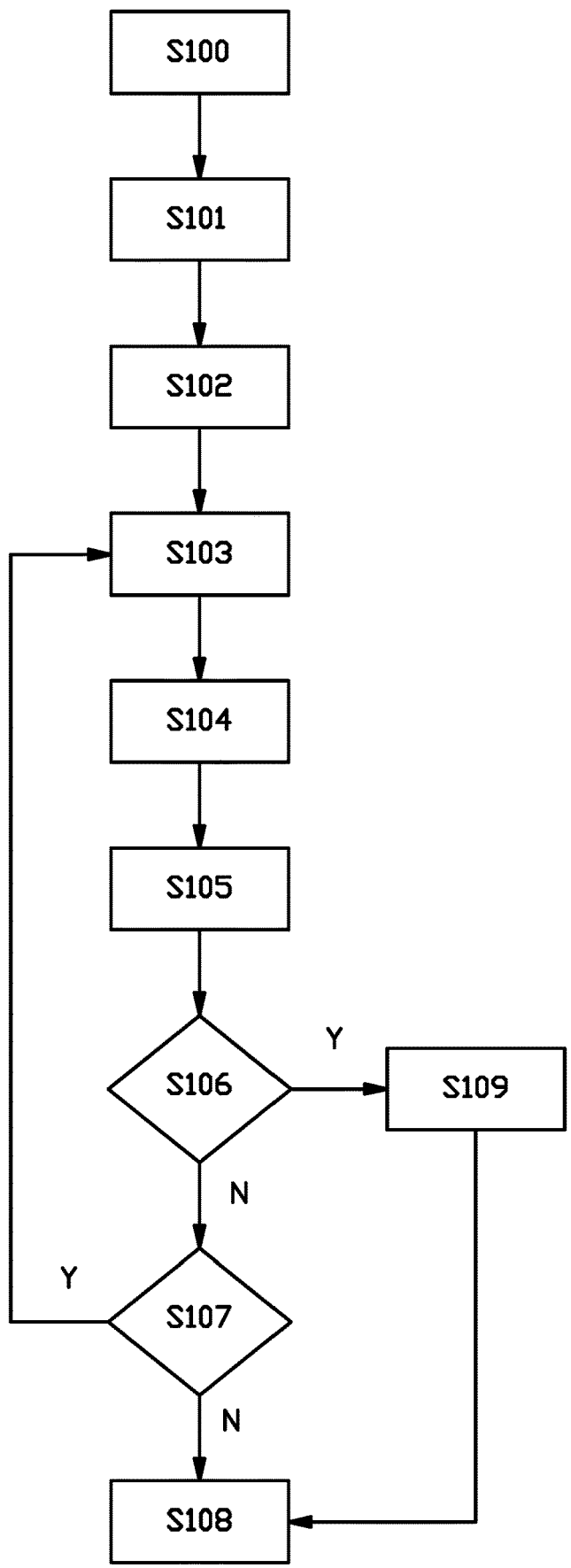
FIG. 8 shows a diagram of the steps of a method for testing a feeder unit.

A method of testing a feeder unit is described below with reference to a single feeder unit 2. The method comprises the following steps, which are also schematically shown in FIG. 8.

In the context of the present patent application, it is noted that a feeder unit is designed for dispensing a particular tablet, pill or medication. Before the feeder unit is used in a dispensing system 1 as described above, the feeder unit is tested by means of the test station 100. The testing process comprises as a first step, S100, the filling of the feeder unit to be tested to a predetermined fill level, or with a predetermined number of medicaments. When the feeder unit is filled, the feeder unit is docked within one of the docking positions 107 of the test stations, step S101.

When the feeder unit is docked into one of the docking positions 107, the RFID reader of the test station 100 reads the RFID chip of the feeder unit, step S102, in order to identify the docked feeder unit.

After identifying the docked feeder unit, the driving motor of the docking position 107 is operated in order to drive the singulating body and the storage body of the feeder unit, step S103. During operating the driving motor, the separation detection arrangement detects whether a single medicament is separated from the remaining medicaments within the feeder unit and is moved into one of the waiting chambers, and the drop detection arrangement detects whether a medicament is dispensed from the feeder unit into the chute 111 of the docking position 107, step 104.

Data from the separation detection arrangement and from the drop detection arrangement is received by the controller of the test station 100. It is noted that the data from both the detection arrangements provide among others information about the behaviour of the medicaments within the feeder unit, and about the behaviour of a medicament falling through the chute 11. The controller of the test station 100 processes the data from both detection arrangements in order to determine parameters for controlling the docked feeder unit, step S105. The parameters for controlling the feeder unit pertain to, but are not limited to, reliability and speed of dispensing medicaments from the feeder unit. This may be understood as that it is desirable to dispense medicaments from the feeder unit as fast as possible while medicaments are separated reliable from the remaining medicaments within the feeder unit.

When the parameters are determined, it is determined whether the test process is completed, step S106. Whether the test process is completed depends among others on whether the determined parameters meet predetermined criteria. For example, the test is ended when all medicaments have been dispensed from the feeder unit, or when too many dispensing errors have occurred. If it is determined that the test process is not completed yet, it is determined whether there are still medicaments present within the feeder unit, step S107. In the affirmative, the process repeats steps S103-S106 which steps may be repeated as often as necessary. In the non-affirmative, the test process is ended and the ending of the test process is indicated to the operator, step S108.

When it is determined in step S106 that the test process is completed, e.g. that the determined parameters meet predetermined criteria, the determined parameters, together with the identification of the tested feeder unit, are saved and, optionally, stored into a database, S109, such that the determined parameters may be used by a dispensing system 1 as described above. After saving the determined parameters, the test process is ended, step S108.

The test process may be repeated several times, wherein the feeder unit, for example, has a fill level of 20%, 40%, 60%, 80% or 100% during the repetitions of the test process. Alternatively, the feeder unit is completely filled and subsequently is tested by dispensing a large number of medicaments, e.g. till the feeder unit is empty. In this case, the test may start at 100% filling and ends at 0% filling, thereby passing, for example, 80% filling, 60% filling, 40% filling and 20% filling. In this manner, the test process may be used for providing recommendations about the optimum fill level of the feeder unit when used in the dispensing system 1.

Figure 9:
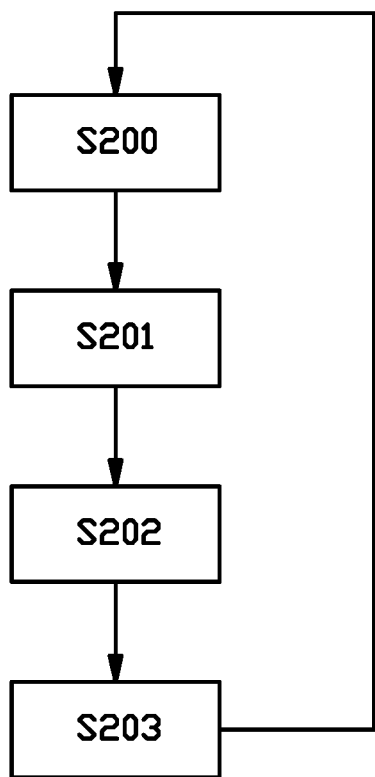
FIG. 9 shows a diagram of the steps of a method for determining a fill level of a feeder unit.

A method of determining a filling level of one of the feeder units 2 is described below with reference to a single feeder unit 2. The method comprises the following steps, which are also schematically shown in FIG. 9. It is noted that the method may be performed by the dispensing system 1, in particular the controller thereof, as described above.

When the dispensing system 1 detects that a feeder unit 2 is almost empty or is already empty, the dispensing system 1, in particular the controller thereof, provides an indication to an operator that the respective feeder unit 2 needs to be filled or refilled with a particular medicament, step S200. Subsequently, the dispensing system 1 determines the throughput of the particular medicament, for example, since the last time the feeder unit was filled with the particular medicament or the throughput of the medicament since the first time the medicament was dispensed from the dispensing system, step S201.

After or during determining the throughput of the particular medicament, the dispensing system may prompt for the term, for example in days, in which the particular medicament expires. The term in which the particular medicament expires may be the regular term or a shortened term as a result of removing the medicament from the its bulk or blister packaging. Subsequently, the relevant term may be entered into the dispensing system 1 by the operator, step S202.

Alternatively, the dispensing system may prompt for the expiry date of the particular medicament, after or during determining the throughput of the particular medicament. The expiry date of the particular medicament may be the regular expiry date or the advanced expiry date as a result of removing the medicament from its bulk or blister packaging. Subsequently, the relevant expiry date may be entered into the dispensing system 1 by the operator, step S202.

On basis of the determined throughput and the received expiry date, a fill level is determined for the feeder unit, wherein the determined throughput and the received expiry date are taken into account such that the feeder unit is expected to be empty before the received expiry date expires, step S203.

While the description refers to medicaments, tablets, etc., the devices and methods could be used for dispensing other types of solid discrete items for separation and packaging.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

LIST OF REFERENCE NUMERALS 1 dispensing system
2 feeder unit
3 dispensing device
4 collection device
5 packing unit
6 robotic manipulator
7 gripper
20 dispensing positions
21 positioning column
22 drop tube
30 controller
40 collection trays
41 collection frame
50 container chamber
51 container lid
52 container latch
53 container grip
60 dispensing mechanism
61 singulating body
62 singulation chamber
63 medicaments
64 conical top surface
65 first release member
66 release opening
67 separating member
68 storage body
69 waiting chamber
70 second release member
71 dispensing opening
72 passage
73 light source
74 light detector
75 connector
76 second light source
77 second light detector
78 alignment encoder
100 test station
101 station housing
102 bottom plate
103 side wall
104 front wall
105 top plate
106 recipient space
107 docking position
108 receiving portion
109 receiving block
110 positioning column
111 chute
112 passage
113 light source
114 light detector
115 RFID reader
116 driving coupling
S1-S10 steps of dispensing method
S101-S109 steps of testing method
S201-S203 steps of method for determining filling level
R rotation axis
A rotation direction

The invention claimed is:

1. Test station configured for testing a feeder unit for dispensing discrete medicaments, the test station comprising:
 a docking position configured for receiving a feeder unit to be tested, wherein the docking position comprises:
 a receiving portion configured for at least partially receiving the feeder unit to be tested,
 a drive configured for operatively connecting to the feeder unit and for driving the feeder unit to dispense a medicament therefrom,
 one or more sensors configured for sensing the behaviour of the medicament within the feeder unit and/or for sensing the behaviour of a medicament of the plurality of medicaments dispensed from the feeder unit, wherein the behaviour within the feeder unit comprises fall speed and/or separation of a medicament from the plurality of medicaments and behaviour of a medicament dispensed from the feeder unit comprises dispensing speed, whether a medicament is dispensed and dispensing error, and
 a controller operatively connected to the sensor and to the drive, and configured for being operatively connected to the feeder unit to be tested,
 wherein the controller is configured for, upon driving the feeder unit, receiving data from the one or more sensors pertaining to the behaviour of the medicament within the feeder unit and/or the behaviour of the medicaments dispensed from the feeder unit, and wherein the controller further is configured for determining parameters to control the tested feeder unit on basis of the data received from the one or more sensors, wherein the parameters comprise one or more of dispensing speed, optimal waiting period, and optimal fill levels.

2. The test station according to claim 1, wherein the test station comprises a chute located below the feeder unit to be tested and configured for receiving a medicament dispensed from the feeder unit.

3. The test station according to claim 1, wherein the one or more sensors comprises a first sensor for sensing the behaviour of the medicament within the feeder unit, and/or a second sensor for sensing the behaviour of a medicament of the plurality of medicaments dispensed from the feeder unit.

4. The test station according to claim 3, wherein the first sensor is configured for sensing whether a medicament is separated from the plurality of medicaments within the feeder unit, and/or the second sensor is configured for sensing whether a medicament of the plurality of medicaments is dispensed from the feeder unit.

5. The test station according to claim 1, wherein the test station comprises an identifying unit configured for identifying a feeder unit to be tested that is received at the docking position.

6. The test station according to claim 5, wherein the controller is operatively connected to the identifying unit in order to receive data pertaining to an identified feeder unit, wherein the controller further is configured for saving and/or transmitting the determined parameters in association with the identified feeder unit.

7. The test station according to claim 5, wherein the identifying unit is configured for reading a RFID tag of a feeder unit to be tested.

8. Method for testing a feeder unit by means of a test station according to claim 1, the method comprising the steps of:
   filling the feeder unit with medicaments to a predetermined fill level;
   docking the feeder unit into the docking position of the test station;
   driving the feeder unit in order to dispense at least one medicament from the feeder unit;
   while driving the feeder unit, detecting the behaviour of the medicaments within the feeder unit and/or the behaviour of a medicament dispensed from the feeder unit;
   on basis of data associated with the detected behaviour of the medicaments within the feeder unit and/or the detected behaviour of a medicament dispensed from the feeder unit, determining parameters to control the tested feeder unit.

9. The method according to claim 8, wherein the method comprises the step of identifying the docked feeder unit.

10. The method according to claim 8, wherein the method comprises the step of, after the step of determining the parameters, determining whether the test process is completed.

11. The method according to claim 10, wherein the method comprises the step of repeating the following steps, when it is determined that the test process is not completed:
    driving the feeder unit in order to dispense at least one medicaments from the feeder unit;
    while driving the feeder unit, detecting the behaviour of the medicaments within the feeder unit and/or the behaviour of a medicament dispensed from the feeder unit;
    on basis of data associated with the detected behaviour of the medicaments within the feeder unit and/or the detected behaviour of a medicament dispensed the feeder unit, determining parameters to control the tested feeder unit.

12. The method according to claim 11, the method comprises the following step, when it is determined that the test process is completed:
    saving the determined parameters, together with the identification of the tested feeder unit, and, optionally, into a database.

13. The method according to claim 8, wherein the method comprises the step of repeating the following steps one or more times:
    filling the feeder unit with medicaments to a predetermined fill level;
    driving the feeder unit in order to dispense at least one medicaments from the feeder unit;
    while driving the feeder unit, detecting the behaviour of the medicaments within the feeder unit and/or the behaviour of a medicament dispensed from the feeder unit;
    on basis of data associated with the detected behaviour of the medicaments within the feeder unit and/or the detected behaviour of a medicament dispensed from the feeder unit, determining parameters to control the tested feeder unit,
    wherein the fill level of the feeder unit differs for each repetition of the steps.

14. The method according to claim 13, wherein each repetition of the steps is performed for a predetermined fill level, wherein the fill levels for the repetitions have at least a difference of 5%.

15. The method according to claim 14, wherein the step of determining parameters to control the tested feeder unit comprises the step of providing a recommendation about an optimum fill level of the tested feeder unit.

16. The method according to claim 8, wherein the method comprises the step of checking whether any error occurs during testing of the feeder unit.

17. The method according to claim 16, wherein the step of checking whether any error occurs during testing of the feeder unit comprises:
    detecting that an amount of time during which the one or more sensors detect a medicament exceeds a predetermined threshold; and/or
    detecting that an amount of time needed for a singulating body of the feeder unit to move into a next aligned position exceeds a predetermined threshold.

18. The method according to claim 8, wherein the step of determining parameters to control the tested feeder unit comprises the step of determining one or more of, a driving speed for the feeder unit, a waiting period for the feeder unit, and providing a recommendation about an optimum dispensing speed of the tested feeder unit.

19. Method for determining a fill level of a feeder unit, the method comprising the steps of:
    receiving an indication indicating that a feeder unit needs to be filled with a medicament;
    determining the throughput of the respective medicament for a predetermined time period;
    receiving a term in which the medicament to be filled into the feeder unit expires; and determining a fill level for the feeder unit on basis of the determined throughput and the received term, wherein it is taken into account that the feeder unit is emptied before the expiration of the medicament to be filled into the feeder unit.

20. Method according to claim 19, wherein the step of receiving an indication comprises the step of receiving an indication that the feeder unit is empty or almost empty and/or wherein the step of receiving a term in which the medicament expires comprises the step of taking into account a shortened term in which the medicament to be filled in the feeder unit expires.

21. Method according to claim 19, wherein the step of determining the throughput comprises the step of determining the throughput of the respective medicament since the last time the feeder unit was filled or since the first time the medicament has been dispensed.

\* \* \* \* \*